(12) United States Patent
Sheehan et al.

(10) Patent No.: US 8,290,862 B2
(45) Date of Patent: *Oct. 16, 2012

(54) METHOD AND SYSTEM FOR EXPEDITING PAYMENT DELIVERY

(75) Inventors: Mark Sheehan, Newark, DE (US); Ravi Acharya, Philadelphia, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 585 days.

This patent is subject to a terminal disclaimer.

(21) Appl. No.: 10/897,177

(22) Filed: Jul. 23, 2004

(65) Prior Publication Data

US 2006/0020543 A1    Jan. 26, 2006

(51) Int. Cl.
*G06Q 40/00* (2006.01)
(52) U.S. Cl. .............................. 705/40; 705/39; 705/41
(58) Field of Classification Search .................. 705/40
See application file for complete search history.

(56) References Cited

U.S. PATENT DOCUMENTS

| | | |
|---|---|---|
| 3,653,480 A | 4/1972 | Yamamoto et al. |
| 4,050,375 A | 9/1977 | Orleans |
| 4,141,078 A | 2/1979 | Bridges et al. |
| 4,205,780 A | 6/1980 | Burns |
| 4,264,808 A | 4/1981 | Owens et al. |
| 4,321,672 A | 3/1982 | Braun et al. |
| 4,396,985 A | 8/1983 | Ohara |
| RE31,692 E | 10/1984 | Tyburski et al. |
| 4,495,018 A | 1/1985 | Vohrer |
| 4,617,457 A | 10/1986 | Granzow et al. |
| 4,672,377 A | 6/1987 | Murphy et al. |
| 4,694,397 A | 9/1987 | Grant et al. |
| 4,700,055 A | 10/1987 | Kashkashian, Jr. |
| 4,713,761 A | 12/1987 | Sharpe et al. |
| 4,752,877 A | 6/1988 | Roberts et al. |
| 4,797,913 A | 1/1989 | Kaplan et al. |
| 4,799,156 A | 1/1989 | Shavit et al. |
| 4,807,177 A | 2/1989 | Ward |
| 4,812,628 A | 3/1989 | Boston et al. |
| 4,823,264 A | 4/1989 | Deming |
| 4,893,333 A | 1/1990 | Baran et al. |

(Continued)

FOREIGN PATENT DOCUMENTS

EP            0 099 999 A2    7/1983

(Continued)

OTHER PUBLICATIONS

Annual Report Pursuant to Sectin 13 or 15(d) of the Securities Exchange Act of 1934, Form 10-K, Intelidata Technologies Corporation, Fiscal Year Ended Dec. 31, 2001.

(Continued)

*Primary Examiner* — Mussa A Shaawat
(74) *Attorney, Agent, or Firm* — Hunton & Williams LLP

(57) ABSTRACT

A method and system of the present invention are directed to expediting payments for scheduled delivery (e.g., next day delivery) to various payees or recipients. A computer implemented method and system for expediting payments may include receiving recipient data and payment data from a customer at a remote location; wherein recipient data comprises recipient identifier and payment data comprises payment type; obtaining a payment instrument based at least in part on the payment data; debiting an amount of the payment instrument from an account identified by the customer; and delivering the payment instrument to a facility; wherein the facility delivers the payment instrument to a recipient identified by the recipient data entered by the customer.

17 Claims, 5 Drawing Sheets

U.S. PATENT DOCUMENTS

| | | |
|---|---|---|
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,988,849 A | 1/1991 | Sasaki et al. |
| 4,992,646 A | 2/1991 | Collin |
| 4,992,940 A | 2/1991 | Dworkin |
| 5,023,904 A | 6/1991 | Kaplan et al. |
| 5,053,607 A | 10/1991 | Carlson et al. |
| 5,054,096 A | 10/1991 | Beizer |
| 5,080,748 A | 1/1992 | Bonomi |
| 5,111,395 A | 5/1992 | Smith et al. |
| 5,121,945 A | 6/1992 | Thomson et al. |
| 5,122,950 A | 6/1992 | Benton et al. |
| 5,136,502 A | 8/1992 | Van Remortel et al. |
| 5,175,682 A | 12/1992 | Higashiyama et al. |
| 5,187,750 A | 2/1993 | Behera |
| 5,198,975 A | 3/1993 | Baker et al. |
| 5,220,501 A | 6/1993 | Lawlor |
| 5,225,978 A | 7/1993 | Petersen |
| 5,237,159 A | 8/1993 | Stephens |
| 5,237,620 A | 8/1993 | Deaton et al. |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Kamata et al. |
| 5,326,959 A | 7/1994 | Perazza |
| 5,336,870 A | 8/1994 | Hughes et al. |
| 5,349,170 A | 9/1994 | Kern |
| 5,350,906 A | 9/1994 | Brody et al. |
| 5,367,581 A | 11/1994 | Abel et al. |
| 5,373,550 A | 12/1994 | Campbell et al. |
| 5,396,417 A | 3/1995 | Burks et al. |
| 5,402,474 A | 3/1995 | Miller et al. |
| 5,412,190 A | 5/1995 | Josephson et al. |
| 5,420,405 A | 5/1995 | Chasek |
| 5,424,938 A | 6/1995 | Wagner et al. |
| 5,430,644 A | 7/1995 | Deaton et al. |
| 5,432,506 A | 7/1995 | Chapman |
| 5,444,794 A | 8/1995 | Uhland, Sr. |
| 5,444,841 A | 8/1995 | Glaser et al. |
| 5,446,740 A | 8/1995 | Yien et al. |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,479,532 A | 12/1995 | Abel et al. |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,537,314 A | 7/1996 | Kanter |
| 5,544,040 A | 8/1996 | Gerbaulet |
| 5,544,043 A | 8/1996 | Miki et al. |
| 5,544,046 A | 8/1996 | Niwa |
| 5,550,734 A | 8/1996 | Tarter et al. |
| 5,551,021 A | 8/1996 | Harada et al. |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien et al. |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron et al. |
| 5,599,528 A | 2/1997 | Igaki |
| 5,603,025 A | 2/1997 | Tabb |
| 5,615,109 A | 3/1997 | Eder |
| 5,619,558 A | 4/1997 | Jheeta |
| 5,621,201 A | 4/1997 | Langhans et al. |
| 5,640,577 A | 6/1997 | Scharmer |
| 5,642,419 A | 6/1997 | Rosen |
| 5,644,778 A | 7/1997 | Burks et al. |
| 5,649,117 A | 7/1997 | Landry |
| 5,652,786 A | 7/1997 | Rogers |
| 5,659,165 A | 8/1997 | Jennings et al. |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton et al. |
| 5,679,940 A | 10/1997 | Templeton et al. |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,748,780 A | 5/1998 | Stolfo |
| 5,751,842 A | 5/1998 | Riach et al. |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,823,463 A | 10/1998 | Fissmann et al. |
| 5,826,241 A | 10/1998 | Stein et al. |
| 5,826,245 A | 10/1998 | Sandberg-Diment |
| 5,832,447 A | 11/1998 | Rieker |
| 5,832,460 A | 11/1998 | Bednar et al. |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts et al. |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight et al. |
| 5,878,141 A | 3/1999 | Daly et al. |
| 5,883,810 A | 3/1999 | Franklin et al. |
| 5,884,288 A | 3/1999 | Chang et al. |
| 5,884,290 A | 3/1999 | Smorodinsky et al. |
| 5,897,625 A | 4/1999 | Gustin et al. |
| 5,898,157 A | 4/1999 | Mangili et al. |
| 5,903,881 A | 5/1999 | Schrader et al. |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,956,700 A | 9/1999 | Landry |

| | | | |
|---|---|---|---|
| 5,963,659 A | 10/1999 | Cahill et al. | |
| 5,963,925 A | 10/1999 | Kolling et al. | |
| 5,966,698 A | 10/1999 | Pollin | |
| 5,978,780 A | 11/1999 | Watson | |
| 5,987,435 A | 11/1999 | Weiss et al. | |
| 5,987,436 A | 11/1999 | Halbrook | |
| 5,987,439 A | 11/1999 | Gustin et al. | |
| 5,991,750 A | 11/1999 | Watson | |
| 6,000,832 A | 12/1999 | Franklin et al. | |
| 6,003,762 A | 12/1999 | Hayashida | |
| 6,006,208 A | 12/1999 | Forst et al. | |
| 6,009,442 A | 12/1999 | Chen et al. | |
| 6,014,636 A | 1/2000 | Reeder | |
| 6,016,482 A | 1/2000 | Molinari et al. | |
| 6,016,484 A | 1/2000 | Williams et al. | |
| 6,018,718 A | 1/2000 | Walker et al. | |
| 6,026,388 A | 2/2000 | Liddy et al. | |
| 6,029,139 A | 2/2000 | Cunningham et al. | |
| 6,032,133 A | 2/2000 | Hilt et al. | |
| 6,032,137 A | 2/2000 | Hallard | |
| 6,035,281 A | 3/2000 | Crosskey et al. | |
| 6,035,285 A | 3/2000 | Schlect et al. | |
| 6,035,287 A | 3/2000 | Stallaert et al. | |
| 6,038,553 A | 3/2000 | Hyde, Jr. | |
| 6,041,312 A | 3/2000 | Bickerton et al. | |
| 6,041,315 A | 3/2000 | Pollin | |
| 6,044,362 A | 3/2000 | Neely | |
| 6,045,039 A | 4/2000 | Stinson et al. | |
| 6,047,261 A | 4/2000 | Siefert | |
| 6,052,674 A | 4/2000 | Zervides et al. | |
| 6,058,380 A | 5/2000 | Anderson et al. | |
| 6,058,381 A | 5/2000 | Nelson | |
| 6,061,665 A | 5/2000 | Bahreman | |
| 6,064,764 A | 5/2000 | Bhaskaran et al. | |
| 6,064,987 A | 5/2000 | Walker et al. | |
| 6,065,675 A | 5/2000 | Teicher | |
| 6,067,524 A | 5/2000 | Byerly et al. | |
| 6,070,150 A | 5/2000 | Remington et al. | |
| 6,070,798 A | 6/2000 | Nethery | |
| 6,073,104 A | 6/2000 | Field | |
| 6,073,113 A | 6/2000 | Guinan | |
| 6,076,072 A | 6/2000 | Libman | |
| 6,078,907 A | 6/2000 | Lamm | |
| 6,081,790 A | 6/2000 | Rosen | |
| 6,085,168 A | 7/2000 | Mori et al. | |
| 6,088,683 A | 7/2000 | Jalili | |
| 6,088,685 A | 7/2000 | Kiron et al. | |
| 6,088,686 A | 7/2000 | Walker et al. | |
| 6,092,056 A | 7/2000 | Tull, Jr. et al. | |
| 6,098,053 A | 8/2000 | Slater | |
| 6,098,070 A | 8/2000 | Maxwell | |
| 6,105,011 A | 8/2000 | Morrison, Jr. | |
| 6,108,639 A | 8/2000 | Walker et al. | |
| 6,110,044 A | 8/2000 | Stern | |
| 6,111,858 A | 8/2000 | Greaves et al. | |
| 6,115,690 A | 9/2000 | Wong | |
| 6,119,106 A | 9/2000 | Mersky et al. | |
| 6,119,107 A | 9/2000 | Polk | |
| 6,125,354 A | 9/2000 | MacFarlane et al. | |
| 6,128,602 A | 10/2000 | Northington et al. | |
| 6,128,603 A | 10/2000 | Dent et al. | |
| 6,129,273 A | 10/2000 | Shah | |
| 6,138,118 A | 10/2000 | Koppstein et al. | |
| 6,144,946 A | 11/2000 | Iwamura | |
| 6,148,293 A | 11/2000 | King | |
| 6,149,055 A | 11/2000 | Gatto | |
| 6,149,056 A | 11/2000 | Stinson et al. | |
| 6,173,272 B1 * | 1/2001 | Thomas et al. | 705/42 |
| 6,181,837 B1 | 1/2001 | Cahill et al. | |
| 6,185,544 B1 | 2/2001 | Sakamoto et al. | |
| 6,202,054 B1 * | 3/2001 | Lawlor et al. | 705/42 |
| 6,205,433 B1 | 3/2001 | Boesch et al. | |
| 6,213,391 B1 | 4/2001 | Lewis | |
| 6,227,447 B1 | 5/2001 | Campisano | |
| 6,233,565 B1 | 5/2001 | Lewis et al. | |
| 6,233,566 B1 | 5/2001 | Levine et al. | |
| 6,236,972 B1 | 5/2001 | Shkedy | |
| 6,240,444 B1 | 5/2001 | Fin et al. | |
| 6,278,981 B1 | 8/2001 | Dembo et al. | |
| 6,289,322 B1 | 9/2001 | Kitchen et al. | |
| 6,292,789 B1 * | 9/2001 | Schutzer | 705/40 |
| 6,301,379 B1 | 10/2001 | Thompson et al. | |
| 6,301,567 B1 | 10/2001 | Leong et al. | |
| 6,304,858 B1 | 10/2001 | Mosler et al. | |
| 6,321,212 B1 | 11/2001 | Lange | |
| 6,324,524 B1 | 11/2001 | Lent et al. | |
| 6,338,047 B1 | 1/2002 | Wallman | |
| 6,338,049 B1 | 1/2002 | Walker et al. | |
| 6,343,279 B1 | 1/2002 | Bissonette et al. | |
| 6,363,164 B1 | 3/2002 | Jones et al. | |
| 6,363,364 B1 | 3/2002 | Nel | |
| 6,363,365 B1 | 3/2002 | Kou | |
| 6,366,967 B1 | 4/2002 | Wagner | |
| 6,374,235 B1 | 4/2002 | Chen et al. | |
| 6,390,362 B1 | 5/2002 | Martin | |
| 6,393,409 B2 | 5/2002 | Young et al. | |
| 6,405,173 B1 | 6/2002 | Honarvar et al. | |
| 6,415,259 B1 | 7/2002 | Wolfinger et al. | |
| 6,418,419 B1 | 7/2002 | Nieboer et al. | |
| 6,418,420 B1 | 7/2002 | DiGiorgio et al. | |
| 6,418,430 B1 | 7/2002 | DeFazio et al. | |
| 6,434,159 B1 | 8/2002 | Woodward et al. | |
| 6,446,072 B1 | 9/2002 | Schulze et al. | |
| 6,460,020 B1 | 10/2002 | Pool et al. | |
| 6,490,568 B1 | 12/2002 | Omara et al. | |
| 6,493,685 B1 | 12/2002 | Ensel et al. | |
| 6,535,896 B2 | 3/2003 | Britton et al. | |
| 6,536,663 B1 | 3/2003 | Lozier et al. | |
| 6,554,185 B1 | 4/2003 | Montross et al. | |
| 6,574,350 B1 | 6/2003 | Rhoads et al. | |
| 6,574,377 B1 | 6/2003 | Cahill et al. | |
| 6,578,000 B1 | 6/2003 | Dodrill et al. | |
| 6,578,015 B1 | 6/2003 | Haseltine et al. | |
| 6,609,113 B1 | 8/2003 | O'Leary et al. | |
| 6,609,125 B1 | 8/2003 | Layne et al. | |
| 6,629,081 B1 | 9/2003 | Cornelius et al. | |
| 6,631,849 B2 | 10/2003 | Blossom | |
| 6,636,615 B1 | 10/2003 | Rhoads et al. | |
| 6,655,585 B2 * | 12/2003 | Shinn | 235/382 |
| 6,658,393 B1 | 12/2003 | Basch et al. | |
| 6,661,910 B2 | 12/2003 | Jones et al. | |
| 6,704,714 B1 | 3/2004 | O'Leary et al. | |
| 6,718,388 B1 | 4/2004 | Yarborough | |
| 6,721,715 B2 | 4/2004 | Nemzow | |
| 6,728,397 B2 | 4/2004 | McNeal | |
| 6,820,058 B2 | 11/2004 | Wood et al. | |
| 6,825,940 B1 | 11/2004 | Wu et al. | |
| 6,860,375 B2 | 3/2005 | Hallowell et al. | |
| 6,954,896 B1 | 10/2005 | Dodrill et al. | |
| 6,965,882 B1 | 11/2005 | Lapstun et al. | |
| 6,970,259 B1 | 11/2005 | Lunt et al. | |
| 6,970,855 B1 | 11/2005 | Das et al. | |
| RE38,957 E | 1/2006 | Laussermair et al. | |
| 6,999,943 B1 | 2/2006 | Johnson et al. | |
| 7,004,382 B2 | 2/2006 | Sandru | |
| 7,062,456 B1 | 6/2006 | Riehl et al. | |
| 7,068,832 B1 | 6/2006 | Price et al. | |
| 7,072,864 B2 | 7/2006 | Brake, Jr. | |
| 7,104,443 B1 | 9/2006 | Paul et al. | |
| 7,130,828 B2 * | 10/2006 | Phillips et al. | 705/41 |
| 7,133,846 B1 | 11/2006 | Ginter et al. | |
| 7,163,153 B2 | 1/2007 | Blossom | |
| 7,174,314 B2 * | 2/2007 | Phillips et al. | 705/41 |
| 7,177,836 B1 * | 2/2007 | German et al. | 705/40 |
| 7,191,952 B2 | 3/2007 | Blossom | |
| 7,194,437 B1 | 3/2007 | Britto et al. | |
| 7,200,255 B2 | 4/2007 | Jones et al. | |
| 7,263,507 B1 | 8/2007 | Brake | |
| 7,313,543 B1 | 12/2007 | Crane et al. | |
| 7,317,823 B1 | 1/2008 | Price et al. | |
| 7,328,191 B2 * | 2/2008 | McGee et al. | 705/67 |
| 7,337,148 B2 | 2/2008 | Xie et al. | |
| 7,349,884 B1 | 3/2008 | Odom | |
| 7,380,707 B1 | 6/2008 | Fredman | |
| 7,392,222 B1 | 6/2008 | Hamilton | |
| 7,401,048 B2 | 7/2008 | Rosedale et al. | |
| 7,401,731 B1 | 7/2008 | Pletz | |
| 7,526,449 B1 | 4/2009 | Blossom | |

| | | | |
|---|---|---|---|
| 7,711,620 B2* | 5/2010 | Abifaker | 705/35 |
| 7,729,986 B1* | 6/2010 | Hoffman et al. | 705/41 |
| 8,019,684 B2* | 9/2011 | Hoffman et al. | 705/41 |
| 2001/0011222 A1 | 8/2001 | McLauchlin et al. | |
| 2001/0018666 A1 | 8/2001 | Sugiyama et al. | |
| 2001/0018739 A1 | 8/2001 | Anderson et al. | |
| 2001/0032139 A1 | 10/2001 | Debonnett, Jr. | |
| 2001/0037300 A1 | 11/2001 | Miyazaki et al. | |
| 2001/0037309 A1 | 11/2001 | Vrain | |
| 2001/0047334 A1 | 11/2001 | Nappe et al. | |
| 2001/0047489 A1 | 11/2001 | Ito et al. | |
| 2001/0051533 A1 | 12/2001 | Wietzke et al. | |
| 2002/0012445 A1 | 1/2002 | Perry | |
| 2002/0013728 A1 | 1/2002 | Wilkman | |
| 2002/0023055 A1* | 2/2002 | Antognini et al. | 705/40 |
| 2002/0026394 A1 | 2/2002 | Savage et al. | |
| 2002/0038363 A1 | 3/2002 | MacLean | |
| 2002/0046169 A1 | 4/2002 | Keresman, III et al. | |
| 2002/0052842 A1 | 5/2002 | Schuba et al. | |
| 2002/0055907 A1 | 5/2002 | Pater et al. | |
| 2002/0069134 A1 | 6/2002 | Solomon | |
| 2002/0072976 A1 | 6/2002 | Virtanen et al. | |
| 2002/0077978 A1 | 6/2002 | O'Leary et al. | |
| 2002/0082985 A1 | 6/2002 | MacKay | |
| 2002/0087415 A1 | 7/2002 | Allen et al. | |
| 2002/0087468 A1 | 7/2002 | Ganesan et al. | |
| 2002/0087469 A1* | 7/2002 | Ganesan et al. | 705/40 |
| 2002/0091635 A1 | 7/2002 | Dilip et al. | |
| 2002/0100803 A1 | 8/2002 | Sehr | |
| 2002/0107770 A1 | 8/2002 | Meyer et al. | |
| 2002/0107788 A1 | 8/2002 | Cunningham | |
| 2002/0111837 A1 | 8/2002 | Aupperle | |
| 2002/0128981 A1 | 9/2002 | Kawan et al. | |
| 2002/0138398 A1 | 9/2002 | Kalin et al. | |
| 2002/0169658 A1 | 11/2002 | Adler | |
| 2002/0170966 A1 | 11/2002 | Hannigan et al. | |
| 2002/0178071 A1 | 11/2002 | Walker et al. | |
| 2002/0184151 A1 | 12/2002 | Maloney | |
| 2002/0194096 A1 | 12/2002 | Falcone et al. | |
| 2002/0198817 A1 | 12/2002 | Dhir | |
| 2002/0199182 A1 | 12/2002 | Whitehead | |
| 2003/0018557 A1 | 1/2003 | Gilbert et al. | |
| 2003/0023549 A1* | 1/2003 | Armes et al. | 705/40 |
| 2003/0037002 A1 | 2/2003 | Higgins et al. | |
| 2003/0040959 A1 | 2/2003 | Fei et al. | |
| 2003/0046218 A1 | 3/2003 | Albanese et al. | |
| 2003/0055675 A1 | 3/2003 | Klein Twennaar | |
| 2003/0061157 A1 | 3/2003 | Hirka | |
| 2003/0069780 A1 | 4/2003 | Hailwood et al. | |
| 2003/0097335 A1 | 5/2003 | Muskowitz et al. | |
| 2003/0101131 A1 | 5/2003 | Warren | |
| 2003/0105641 A1 | 6/2003 | Lewis | |
| 2003/0110442 A1 | 6/2003 | Battle | |
| 2003/0120686 A1 | 6/2003 | Kim et al. | |
| 2003/0130945 A1 | 7/2003 | Force et al. | |
| 2003/0130952 A1 | 7/2003 | Bell et al. | |
| 2003/0144935 A1* | 7/2003 | Sobek | 705/35 |
| 2003/0144942 A1 | 7/2003 | Sobek | |
| 2003/0187789 A1 | 10/2003 | Karas et al. | |
| 2003/0191710 A1 | 10/2003 | Green et al. | |
| 2003/0200107 A1 | 10/2003 | Allen et al. | |
| 2003/0208421 A1 | 11/2003 | Vicknair et al. | |
| 2003/0208441 A1 | 11/2003 | Poplawski et al. | |
| 2003/0225663 A1 | 12/2003 | Horan et al. | |
| 2003/0233305 A1 | 12/2003 | Solomon | |
| 2003/0237046 A1 | 12/2003 | Parker et al. | |
| 2004/0064409 A1* | 4/2004 | Kight et al. | 705/40 |
| 2004/0078328 A1 | 4/2004 | Talbert et al. | |
| 2004/0118914 A1* | 6/2004 | Smith et al. | 235/380 |
| 2004/0133516 A1 | 7/2004 | Buchanan et al. | |
| 2004/0140361 A1* | 7/2004 | Paul et al. | 235/462.45 |
| 2004/0201735 A1 | 10/2004 | Baron | |
| 2004/0228514 A1 | 11/2004 | Houle et al. | |
| 2005/0033690 A1 | 2/2005 | Antognini et al. | |
| 2005/0044040 A1* | 2/2005 | Howard | 705/40 |
| 2005/0055254 A1 | 3/2005 | Schmidtberg et al. | |
| 2005/0086178 A1 | 4/2005 | Xie et al. | |
| 2005/0091156 A1 | 4/2005 | Hailwood et al. | |
| 2005/0097050 A1 | 5/2005 | Orcutt | |
| 2005/0144059 A1 | 6/2005 | Schuessler | |
| 2005/0177480 A1 | 8/2005 | Huang | |
| 2005/0209954 A1 | 9/2005 | Asher et al. | |
| 2005/0228717 A1* | 10/2005 | Gusler et al. | 705/14 |
| 2005/0261955 A1 | 11/2005 | Humble et al. | |
| 2005/0273347 A1 | 12/2005 | Dudley et al. | |
| 2006/0020543 A1 | 1/2006 | Sheehan et al. | |
| 2006/0106650 A1 | 5/2006 | Bush | |
| 2006/0106717 A1 | 5/2006 | Randle et al. | |
| 2006/0136335 A1 | 6/2006 | Ferguson | |
| 2006/0178986 A1 | 8/2006 | Giordano et al. | |
| 2006/0206427 A1 | 9/2006 | Love et al. | |
| 2006/0212391 A1 | 9/2006 | Norman et al. | |
| 2006/0282389 A1 | 12/2006 | Gupte | |
| 2006/0287953 A1 | 12/2006 | Chauhan | |
| 2007/0055625 A1 | 3/2007 | Sheehan et al. | |
| 2007/0118470 A1 | 5/2007 | Warren et al. | |
| 2007/0220272 A1* | 9/2007 | Campisi et al. | 713/186 |
| 2008/0040249 A1 | 2/2008 | Re et al. | |
| 2008/0162299 A1* | 7/2008 | Gusler et al. | 705/26 |
| 2008/0193008 A1 | 8/2008 | Mount et al. | |
| 2008/0288396 A1 | 11/2008 | Siggers | |
| 2010/0332393 A1* | 12/2010 | Weller et al. | 705/44 |

FOREIGN PATENT DOCUMENTS

| | | |
|---|---|---|
| EP | 421808 | 4/1991 |
| EP | 1014318 | 6/2000 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/047022 | 6/2002 |
| WO | WO 02/063432 | 8/2002 |
| WO | WO 2004/079603 | 9/2004 |

OTHER PUBLICATIONS

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying by Credit Card-Real World and Online, http://www.virtualschool.edu/mon/ElectronicProperty/klamond/credit, printed Jul. 8, 2005, 17 pages.

Dialog file 20, #10279554.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Money, Initial Launch to 200 Credit Unions, USA Today.com, Jun. 27, 2002.

Decovny, Net Scope, Banking Technology, May 1997.

Nokia Announces the World's First NFC Enabled Mobile Product for Contactless Payment and Ticketing, PRNewswire, Feb. 9, 2005.

Anonymous, Operating in a multi-currency environment, ProQuest document ID 9215937, ISSN/ISBN 09589309, Oct. 1995.

Press Release, Mar. 5, 2004, Payment Data Systems Files Patent on Debit Card Payment Solution, American City Business Journals, Inc., Mar. 5, 2004.

Anonymous, Systems spell change for foreign exchange, Global Investor, ProQuest document ID 1056152B, ISSN/ISBN: 09513604, Nov. 1996.

French, Tech Stocks: Market Movers, Investors Worry CheckFree Being Chased from Its Own Game, http://www.thestreet.com, Jun. 20, 2002.

Technology, In Brief Wachovia-InteliData Deal, May 7, 2002.

Visa & Carnegie Mellon Plan Online Payment Scheme, Newsbyte News Network, Feb. 15, 1995, 2 pages.

Priya, Malhotra, "Clearing House Enumerates e-Payments Ills," American Banker The Financial Services Daily, Tuesday, Aug. 13, 2002, 2 pages.

Financial News, "Wells Fargo Rolls Out Nationwide Lockbox Check Conversion," PR Newswire Association, Apr. 22, 2003, 2 pages.

Cards International Jan. 30, 1996, First Data markets stored-value cards, 2 pages.

Business Wire, Jan. 15, 1996, CES/NaBANCO introduces stored value card technology; blockbuster video is first merchant partner, 2 pages.

Melinda Norris, et al., Omaha World Herald, Jan. 19, 1996, Sunrise Edition, First data unit develops blockbuster cash card, 2 pages.

Valerie Block, The American Banker, Sep. 1, 1995, Blockbuster running test of a stored value card, 2 pages.

Wall Street Journal Nov. 7, 2002, Fidelity Helps Fund Sellers Trim the Taxes They'll Owe, 2 pages.

Harsh Truth: Your Investments Likely Won't Make Any Money, 2 pages.

Huddling With William Bernstein: Small Town Doctor, Investing Pro, 3 pages.

Erica Goode, The New York Times, Nov. 5, 2002, On Profit, Loss and the Mysteries of the Mind, 4 pages.

PNCBank, Today's Issues in Treasury Management, Payor's Prescription for Painless Migration to Electronic Healthcare Payments and Remittance Advices, www.treasury.pncbank.com, 6 pages.

PNCBank, Today's Issues in Treasury Management, Provider's Prescription for Painless Migration to Receipt of Electronic Healthcare Payments and Remittance Advices, www.treasury.pncbank.com, 8 pages.

Gregory Zuckerman, The Wall Street Journal Online, Jun. 12, 2002, The Hedge-Fund Craze, 17 pages.

The Stars in the Sky Flicker, and Fund Stars Do the Same, 3 pages.

Card Flash Daily Payment Card News, Sep. 23, 2004, CardWeb.com Inc., 3 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Maher and Troutman, Payor's Prescription for Painless Migration to Electronic Healthcare Payments and Remittance Advices, PNC Bank, Dec. 2001.

Maturi, Richard, Personal Finance; When you Need to Send Cash in a Flash.

Maher and Troutman, Provider's Prescription for Painless Migration to Receipt of Electronic Healthcare Payments and Remittance Advices, PNC Bank, Dec. 2001.

Terrie Miller and Henry Yan, When Custody Governs, Benefits Canada, Toronto, Feb. 1998, vol. 22, Issue 2, p. 33, 5 pages.

Notification of Transmittal of the International Search Report and the Written Opinion of the International Searching Authority, or the Declaration; PCT/US06/45010; mailed Jun. 26, 2008.

Hunt, Robert M., An Introduction to the Economics of Payment Card Networks.

Fidelity Helps Fund Sellers Trim the Taxes They'll Owe, The Wall Street Journal, Nov. 7, 2002.

First Data markets stored-value cards, Cards International, Jan. 30, 1996, p. 5.

Armstrong, Douglas, Norwest eases difficulty of Interstate banking Bank's customers may use the same account number at any branch.

* cited by examiner

Recipient Information 410

Name 412:

Attention of 414:

Address 416:

Phone Number 418:

Account Number/Description 420:

Check Memo 422:

Payment Information 430

Payable To 432:

Pay From 434:

Amount 436:

Send On 438:

Deliver By 440:

Payment Method 442:

Total Charges/Fees 444:

| Modify 450 | Send Payment 452 | Cancel 454 |
|---|---|---|

Figure 4

Payment Activity Summary Page 502

| Payable To 510 | Pay From 512 | Amount 514 | Send On 516 | Deliver By 518 | Status 520 | Available Action 522 |
|---|---|---|---|---|---|---|
| | | | | | | |

Figure 5

METHOD AND SYSTEM FOR EXPEDITING PAYMENT DELIVERY

FIELD OF THE INVENTION

The present invention relates generally to expediting payments, and more specifically to expediting payments for scheduled delivery (e.g., next day delivery) to various payees or other recipients.

BACKGROUND OF THE INVENTION

For many consumers, including corporations and small businesses, there may be instances where an immediate payment is necessary to avoid late fees, service charges, termination of a service or contractual issues. Repeated late payments may also result in a negative credit report and other adverse consequences. An Internet connection enables consumers to easily schedule payments to various payees through a personal account. However, some payees may request or even require a guaranteed payment, rather than a personal check or online payment. Currently, if consumers want to send a guaranteed payment instrument, the consumer is required to go to a bank (or other institution) and obtain a certified check, cashier's check or other similar instrument. However, as most establishments close at a reasonable closing time, around 5 pm, the transaction must occur during normal business hours. The consumer would then be required to delivery the guaranteed payment to a mail facility for overnight delivery, prior to closing time, which is generally around 6-8 pm. As a result, depending on the consumer's availability and overall convenience, it may take a consumer a few days to delivery a guaranteed payment.

To effectively delivery physical payment instruments to a payee, consumers are still required to coordinate with a mail facility or other distribution center. While some services may provide a guaranteed payment instrument, a recipient is generally required to pick up the payment instrument at a pick-up center.

Other drawbacks may also be present.

SUMMARY OF THE INVENTION

Accordingly, one aspect of the invention is to address one or more of the drawbacks set forth above.

In accordance with an exemplary embodiment of the present invention, a computer implemented method for expediting payments comprises the steps of receiving recipient data and payment data from a customer at a remote location; wherein recipient data comprises recipient identifier and payment data comprises payment type; obtaining a payment instrument based at least in part on the payment data; debiting an amount of the payment instrument from an account identified by the customer; and delivering the payment instrument to a facility; wherein the facility delivers the payment instrument to a recipient identified by the recipient data entered by the customer.

In accordance with further aspects of this exemplary embodiment, the payment type comprises one or more of cashier's check, certified check and money order; the payment type comprises one or more of a token, stored value card, cash, gift certificate, and bearer bond; the recipient data and payment data are entered by the customer on a first day and the payment instrument is delivered to the recipient at least one day after the first day; the method further comprising the step of associating one or more documents from the customer with the payment instrument for delivery to the recipient; the method further comprising the step of providing a tracking identifier to the customer for tracking the delivering of the payment instrument to the recipient; the method further comprising the step of providing status data of the payment instrument to one or more of the facility and the recipient; the method wherein the steps are performed at a financial institution location; the payment instrument is generated at the financial institution location; the method further comprising the step of authenticating the customer to confirm identity of the customer; the payment instrument comprises a stored value card wherein the recipient provides authentication data before the stored value card is activated; the authentication data is provided to a service provider associated with the stored value card; and the stored value card is activated for a designated value after authentication data from the recipient is verified.

In accordance with another exemplary embodiment of the present invention, a computer implemented system for expediting payments, the computer implemented system comprising an information module for receiving recipient data and payment data from a customer at a remote location; wherein recipient data comprises recipient identifier and payment data comprises payment type; payment module for obtaining a payment instrument based at least in part on the payment data and debiting an amount of the payment instrument from an account identified by the customer; and delivery module for delivering the payment instrument to a facility; wherein the facility delivers the payment instrument to a recipient identified by the recipient data entered by the customer.

In accordance with another exemplary embodiment of the present invention, at least one signal embodied in at least one carrier wave for transmitting a computer program of instructions configured to be readable by at least one processor for expediting payments, the computer process comprises receiving means for receiving recipient data and payment data from a customer at a remote location; wherein recipient data comprises recipient identifier and payment data comprises payment type; obtaining means for obtaining a payment instrument based at least in part on the payment data; debiting means for debiting an amount of the payment instrument from an account identified by the customer; and delivering means for delivering the payment instrument to a facility; wherein the facility delivers the payment instrument to a recipient identified by the recipient data entered by the customer.

BRIEF DESCRIPTION OF THE DRAWINGS

FIG. 4 is an exemplary customer interface, according to an embodiment of the present invention.

FIG. 5 is an exemplary customer interface, according to an embodiment of the present invention.

DETAILED DESCRIPTION OF THE INVENTION

An embodiment of the present invention is directed to next day payment services that may be scheduled remotely by a sender (e.g., payor) and does not require pick-up for the recipient/payee. Rather, the payment is sent directly to the payee (or other designated recipient).

Figure 1:
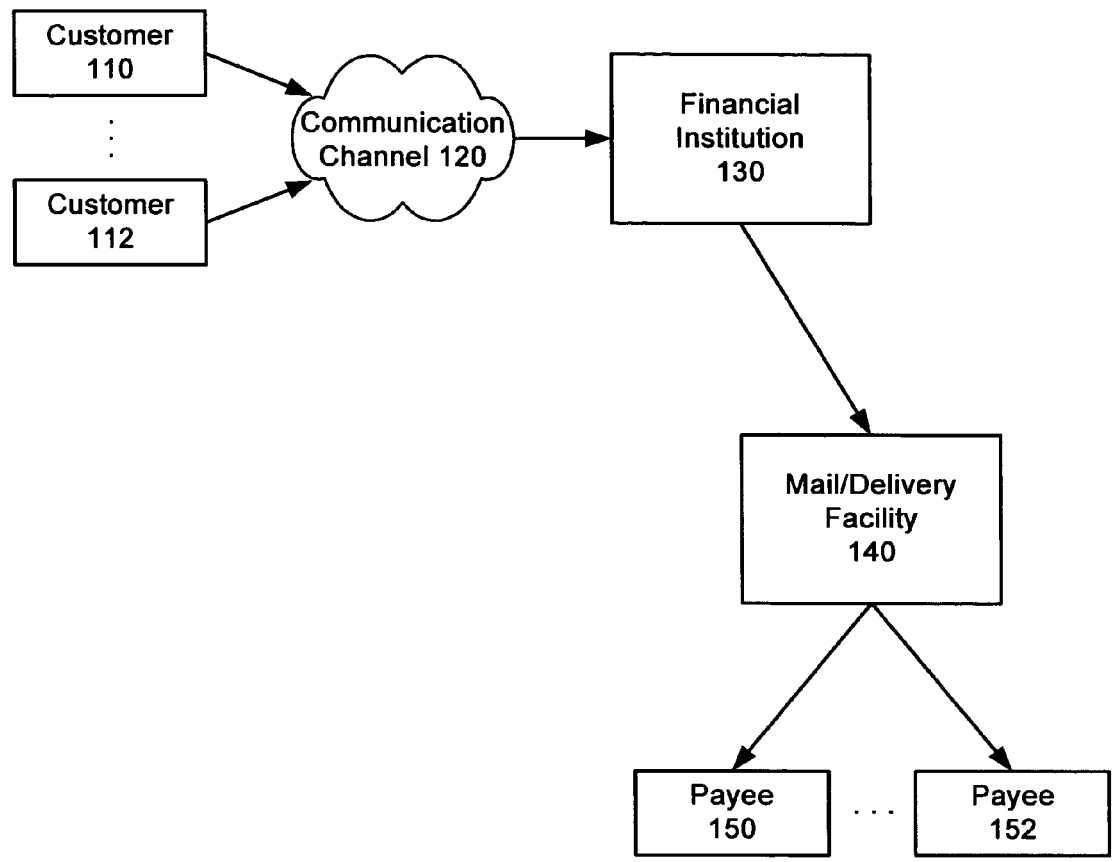
FIG. 1 illustrates an exemplary system for expediting payments, according to an embodiment of the present invention.

FIG. 1 illustrates an exemplary system for expediting payments, according to an embodiment of the present invention. A user, such as customer 110 and customer 112, may schedule a next day delivery of a guaranteed payment remotely through a communication channel 120. Communication channel may include an Internet channel, a Voice Response Unit (VRU) channel over a telephone, or other communication medium. For example, the customer may schedule payments via a computer, laptop, cell phone, PDA, or other remote device.

An embodiment of the present invention enables the customer 110 to communicate with a Financial Institution 130 to schedule a payment. For example, customer 110 may schedule the payment for next day delivery. The payment may be scheduled as late as 10 pm, even as late as midnight. While most conventional delivery service pick-up windows (e.g., UPS™, FedEx™, etc.) close at 6-8 pm, an embodiment of the present invention provides a means for next day payment that is currently unavailable.

Over communication channel 120, customer 110 may provide financial institution 130 information for scheduling a payment for next day delivery. For example, customer 110 may convey the customer's account information (e.g., checking account number, savings account, etc.), security information (e.g., user ID, password (or PIN), etc.) information for the payee/recipient (e.g., address, account number, etc.), and payment information (e.g., type of payment, delivery date, etc.). Other information may also be submitted.

Financial institution 130 then takes the information and generates a physical payment instrument. For example, the physical payment instrument may be a check generated by a check printer or other device. The physical payment instrument may include a guaranteed payment instrument, such as a cashier's check, certified check, money order, check drawn on a bank's account, as compared to an institution or individual, etc. Financial Institution 130 may place the payment instrument into an envelope (e.g., express mail envelope) for delivery. The placement into an envelope may be manual or automated (e.g., an envelope stuffing machine or payment instrument printed so that it may be folded into an envelope, etc.). According to another example, the payment instrument may be obtained from a merchant, a provider or other entity. In the case of a stored value card, the financial institution may receive the stored value card from a provider.

Financial institution 130 may then provide the envelopes to a Mail/Delivery Facility (e.g., an express mail agency (EMA), etc.) 140. For example, financial institution 130 may send the envelopes to Mail/Delivery Facility 140 or Mail/Delivery Facility 140 may pick up the envelopes from financial institution 130. Other arrangements may be agreed upon. Mail/Delivery Facility 140 may then delivery the envelopes with the payment instrument to a designated payee 150 by the next day (e.g. by 10 am) or other scheduled time period. Payee 150, 152 may represent other recipients as well. According to an exemplary application, financial institution 130 and Mail/Delivery Facility 140 may be located in close physical proximity. In addition, an arrangement between financial institution 130 and Mail/Delivery Facility 140 may agree that mail may be accepted at Mail/Delivery Facility 140 after normal business hours. Other arrangements may be agreed upon.

Through an embodiment of the present invention, consumers 110, 112 may schedule next day payments remotely, schedule payment delivery past normal EMA deadlines, and deliver a physical instrument directly to the recipient/payee (with no pickup required) where the instrument may be a guaranteed instrument (or other payment instrument).

Through an embodiment of the present invention, the burden is released from the customer because the financial institution handles the transaction. For example, financial institution 130 may generate or obtain the payment instrument, load the payment instrument into an envelope and provide the envelope to a mail/delivery service.

An embodiment of the present invention may also be applied for walk-in customers to the financial institution or other facility. The payment instrument may be other than a cashier's/certified check. For example, the payment instrument may include a stored value card, cash (in various currencies) or other commodity. The payment instrument may include any token of a designated monetary value, which may be fixed or variable. Other examples may include gift certificates, bearer bonds and other similar types of payments. The customer may receive a tracking number supplied by an EMA agent, which may be provided directly by the financial institution (via email or web page) or may be provided by the EMA.

Figure 2:
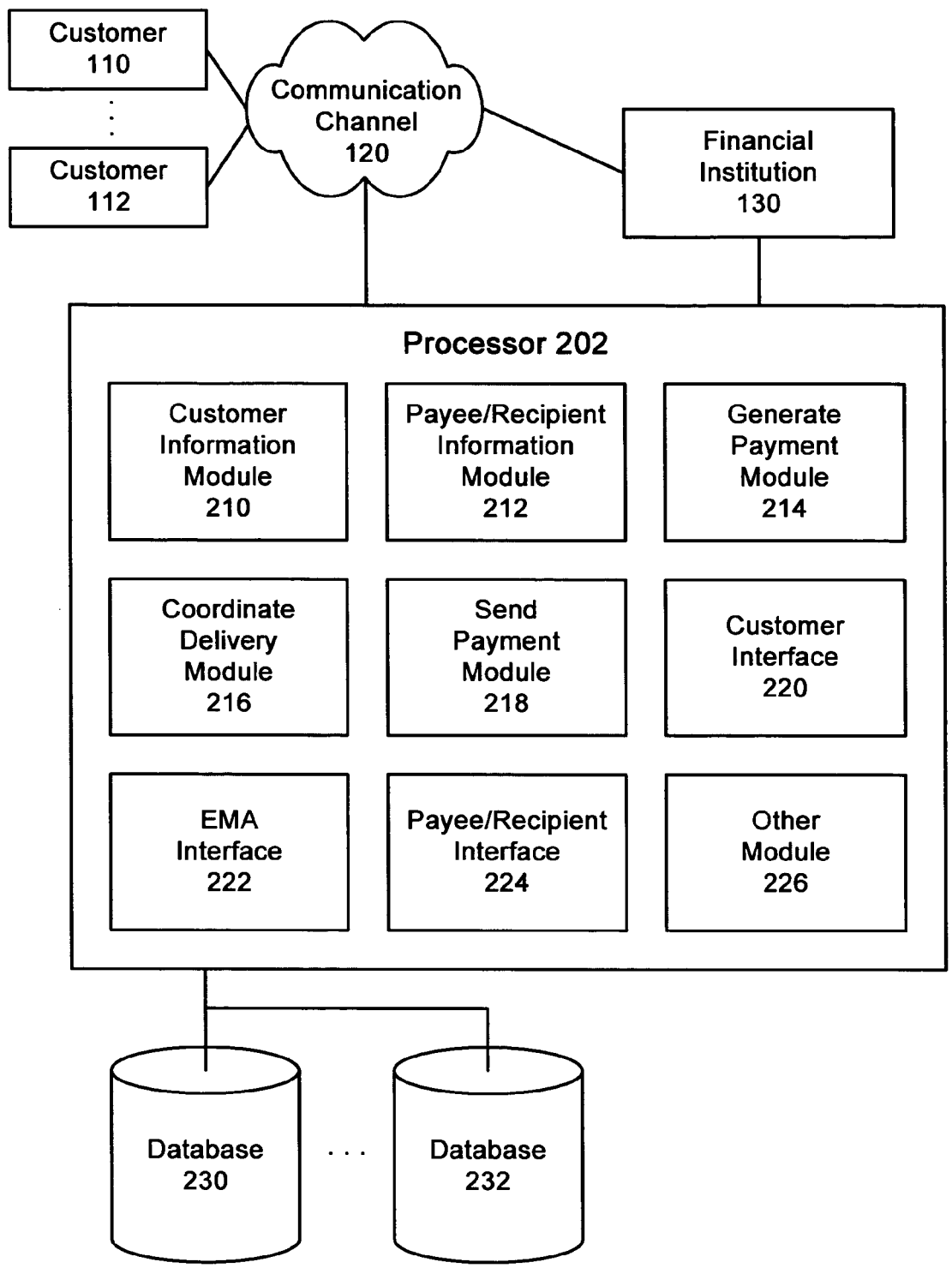
FIG. 2 illustrates an exemplary processor for expediting payments, according to an embodiment of the present invention.

FIG. 2 illustrates an exemplary processor for expediting payments, according to an embodiment of the present invention. Financial Institution 130 may include a processor 130 for expediting payments (e.g., bill payments, etc.). Processor 130 may be part of Financial Institution 130, separate from Financial Institution 130, associated with Financial Institution or based on other arrangement. Processor 130 may include various modules for performing payment functions. For example, Central Processor 130 may include Customer Information Module 210, Payee/Recipient Information Module 212, Generate Payment Module 214, Coordinate Delivery Module 216, Send Payment Module 218, Customer Interface 220, EMA Interface 222, Payee/Recipient Interface 224 and/or other modules, as represented by 226. The modules of Processor 130 may be further combined, duplicated and/or separated. The modules of Processor 130 may also be provided across multiple processors. Other implementations may be realized.

The various modules of Processor 130 may access and/or store data at Databases 230, 232. Various types of data may be stored at and/or accessed from databases 230, 232. Additional databases may be implemented. Further, the databases may be consolidated into a single database as well. Database may include various types of databases, including relational databases. Database 230, 232 may store customer data, payee/recipient data, payment data, etc. Other data may be stored and/or accessed. Other sources of information (e.g., external and/or internal sources of data) may also be accessed by the various modules of Processor 202.

Customers 110, 112 may access Processor 202, via a communication channel 120, such as Internet or other network.

Customer Information Module 210 may receive data from one or more customers, as represented by 110, 112. For example, customer information data may include security information, customer account information, authentication data and/or other data. Security information may include a user name (or identifier), password (or PIN) and/or other security data. Customer account information may include account identifier, account number and/or other account data. For example, authentication may involve verifying customer identity as well as whether the customer is authorized to schedule a payment, access the system of an embodiment of the present invention and/or perform other actions.

Payee/Recipient Information Module 212 may receive data from one or more customers, as represented by 110, 112. For example, payee/recipient information data may include payee/recipient identifier, payment information and/or other data. Payee/Recipient identifier may include name, company, address, phone number, account number, description, payee/recipient contact information and/or other data. Payment information may include amount, type of payment, delivery method, delivery time, check memo and/or other payment data.

Generate Payment Module 214 may generate or obtain one or more payment instruments based at least in part on the payee/recipient information received by Payee/Recipient Information Module 212. Payment instruments may include check, certified check, cashier's check, money order, electronic payment, etc. Various other paper or electronic payment instruments may be generated. In another example, cash (in various currencies) may be delivered to an identified payee/recipient. A token of a monetary value may also be generated or the token may be obtained from another entity. Tokens may include stored value cards, gift certificates, etc. For example, a stored value card may be received from a merchant or other source.

For example, a stored value card (or other similar instrument) may be delivered to an intended recipient. Upon receipt, the intended recipient may contact an entity (e.g., financial institution, merchant, service provider, etc.) for authentication. When authentication is verified, the stored value card may be automatically loaded with an appropriate amount or value. Therefore, unintended recipients will not be able to use the stored value card. The authentication process may involve contacting an entity and providing identification information. For example, an intended recipient may call (or otherwise contact) a service provider and provide a password (or PIN) that was delivered in a different manner (e.g., via email delivery, separate phone contact, mail delivery, etc.). In another example, other authentication information may be provided, including social security number, mother's maiden name, etc. The intended recipient may contact a service provider to activate the stored value card via phone call, email contact, website, and/or other form of communication. For example, the intended recipient may access Payee/Recipient Interface 224 for authentication.

Coordinate Delivery Module 216 may identify specifics directed to delivering the payment instrument. Module 216 may identify a payment route, delivery time, delivery method, and/or special delivery instructions. For example, a customer may request a certified check to be sent to a specific payee/recipient by 10 am the next morning where a signature by an authorized recipient is required.

Send Payment Module 218 may send the payment instrument to a mail facility (or other facility, such as a delivery facility, etc.), such as an Express Mail Facility. The payment instrument may be forwarded to the mail facility, picked up by the mail facility or via other delivery arrangement.

Customer Interface 220 provides an interface for customers to access Processor 202. For example, a customer may check the status on pending or other types of scheduled deliveries. In addition, the customer may receive a tracking number (or other identifier) for tracking a payment in progress. The customer may be alerted when a delivery is received by a payee/recipient, through a preferred mode of communication (e.g., email alert, cell phone message, text message, etc.). EMA Interface 222 provides an interface for the Express Mail Facility (or other mail facility or delivery facility) to access Processor 202. For example, an EMA may be alerted as to how many delivers to expect from financial institution 130 and when to expect each delivery. Payee/Recipient Interface 224 provides an interface for various payees or recipients to access Processor 202. For example, a payee may also check on the status of a payment. The payee (or recipient) may be alerted when a payment is to be expected and how many to expect. Other specifics may also be conveyed.

Figure 3:
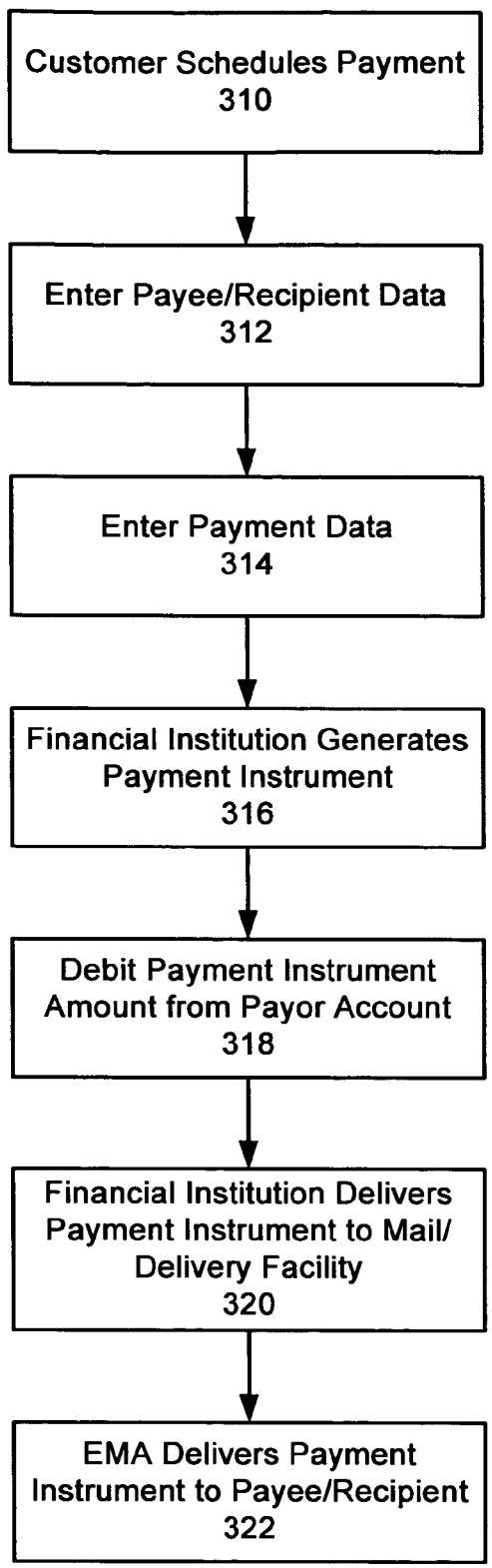
FIG. 3 is an exemplary flowchart illustrating a method for expediting payments, according to an embodiment of the present invention.

FIG. 3 is an exemplary flowchart illustrating a method for expediting payments, according to an embodiment of the present invention. At step 310, a customer may schedule a payment. At step 312, payee/recipient data may be entered. At step 314, payment data may be entered. At step 316, a financial institution may generate a payment instrument. At step 318, payment amount (which may or may not include fees or other charges) may be debited from a payor account. At step 320, the financial institution may delivery the payment instrument to a mail/delivery facility (e.g., EMA or other facility). At step 322, the express mail facility may delivery the payment instrument to an identified payee/recipient. While the process illustrated in FIG. 3 discloses certain steps performed in a particular order, it should be understood that the present invention may be practiced by adding one or more steps to the process, omitting steps within the process and/or altering the order in which one or more steps are performed.

At step 310, a customer may schedule a payment. For example, a customer may represent an individual, company or other entity desiring to make a bill payment or other type of payment. The customer may access a customer interface through a communication channel, such as Internet, VRU or other electronic, wireless or other type of communication medium. Payments may also be scheduled through a wireless device, such as a PDA, cell phone, etc. The customer may identify a payee (or recipient), type of payment, delivery of payment and/or other data related to scheduling a next day payment or other scheduled payment. The customer may schedule a payment until midnight local time. Deliveries may include Saturday, Sunday and holiday deliveries as well as international deliveries.

At step 312, payee/recipient data may be entered. The customer may identify the payee (or recipient) of the payment. The payee/recipient may include an individual, company, merchant, service provider, government entity, non-profit entity and/or other recipient of a payment. Payee/recipient data may include payee identifier (e.g., name, company name, etc.), payment location (e.g., street address, P.O. box, Internet address, etc.) and/or other payee/recipient data. The customer may also include an account identifier associated with the payee/recipient. For example, a company may identify the customer through a unique account identifier, which may be included as payee/recipient data. According to another example, a customer may upload attachments for inclusion with the payment instrument. For example, a customer may upload a remittance advice for delivery with a certified check. Other attachments may include documents, letters, etc.

At step 314, payment data may be entered. The customer may identify a preferred payment instrument. Examples of payment instruments may include check, cashier's check, certified check, money order, electronic payment, etc. Payment data may include amount, date, date of delivery, account identifier, memo and/or other data related to the payment instrument. Other payment specifics may include requiring a signature from the payee/recipient (or other authorization mechanism), time of delivery, receipt by an identified person or agent, descriptions, instructions (for the customer, the payee/recipient or other) and/or other payment specifics.

At step 316, a financial institution may generate or obtain a payment instrument. A check generating device may be located at the financial institution for generating the payment instrument. In another example, software may be loaded at the financial institution for generating the payment instrument. In yet another example, a payment generating device may be separate from the financial institution. In addition, the payment generating device may be located at a separate location, such as the EMA, payee/recipient location and/or other location. According to another example, payment instruments may be received from an entity, such as a merchant, service provider, etc.

At step 318, the payment amount (which may or may not include a service fee) may be debited from the customer's identified account.

At step 320, the financial institution may delivery the payment instrument to a mail/delivery facility. After the payment instrument is generated or obtained, the financial institution may place the payment instrument in an envelope (or other delivery container) for delivery to a mail facility (or other facility, such as a delivery facility, etc.). The placing of the payment instrument in an envelope may be manual, automatic, semi-automatic, etc. The envelope may be an express delivery envelope, for example. The envelopes may include a flag (or identifier) for delivery to the mail facility.

The financial institution and the mail facility (or other facility, such as a delivery facility, etc.) may have an agreement for accepting deliveries from the financial institution. For example, the financial institution may delivery the payment instruments to the mail facility. In another example, the mail facility may conduct scheduled pickups of the payment instrument. The financial institution and the mail facility may be located within close proximity to facilitate delivery and/or pickup. The mail facility may include a mail service (e.g., UPS, FedEx™, etc.), distribution center and/or other facility for receiving and/or delivering mail.

According to another exemplary application, the delivery of the payment instrument may be electronic through an electronic communication medium.

At step 322, the express mail facility may delivery the payment instrument to an identified payee/recipient. The delivery may occur within 24 hours or less of the scheduling of the express payment. In another example, the delivery may occur by the morning of the next day (e.g., 10 am). In addition, the delivery may be scheduled for delivery at a later time, one or more days later. Depending on payment data specifics, a signature or other authentication may be required upon delivery of the payment instrument. Other specifics and/or restrictions may be imposed.

FIG. 4 is an exemplary customer interface, according to an embodiment of the present invention. FIG. 4 illustrates an exemplary screen shot available to a customer for scheduling a payment in accordance with an embodiment of the present invention. Recipient Information 410 may include payee/recipient data. In this exemplary application, recipient information 410 may include name 412 (e.g., name of payee/recipient or other payee/recipient identifier), attention of 414 (e.g., receiving individual, etc.), address 416, phone number 418, account number or description 420 and check memo 422. Other payee/recipient data and/or other information may also be entered or displayed.

Payment Information 430 may include payment data. In this exemplary application, payment information 430 may include payable to 432, pay from 434, amount 436, send on date 438, delivery by date 440, payment method 442 (e.g., overnight delivery, etc.) and total charges/fees 444. Charges and/or fees may or may not be applied to the delivery service. Other payment data and/or other information may also be entered or displayed.

The customer may modify data by selecting 450, send the payment by selecting 452 or cancel the action by selecting 454. Other actions and/or options may be available.

FIG. 5 is an exemplary customer interface, according to an embodiment of the present invention. FIG. 5 may include a summary page of payment activity. A customer may check the status on payments and confirm delivery and/or other actions. Payment activity summary page 502 may include Payable To 510, Pay From 512, Amount 514, Send On 516, Deliver By 518, Status 520, Available Action 522 and/or other data. Payable To 510 may include payee/recipient identification, including company or service name. Pay From 512 may include an account from which the payment instruments are drawn for each payment. Multiple accounts may be used for a single payment. Amount 514 may include a payment amount. Send On 516 may include date (which may include time) of delivery and Deliver By 518 may include date (which may include time) of delivery. Status 520 may include data associated with the status of a scheduled payment. Status 520 may include in-process, pending, shipped, cancelled, returned, etc. Available Action 522 may include view, modify, and/or other actions.

According to an embodiment of the invention, the systems and processes described above invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the embodiments of the present inventions may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the embodiments of the present inventions may comprise computer readable program code in the form of functional instructions stored in the computer-usable medium such that when the computer-usable medium is installed on the system or systems, those components cause the system to perform the functions described. The computer readable program code for the embodiments of the present inventions may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

The invention claimed is:

1. A computer implemented method for expediting payments, wherein the method is executed by a programmed computer processor which communicates with a customer via a network, the computer implemented method comprising the steps of:
   receiving, at an information module using at least the programmed computer processor, recipient data, delivery data, and payment data from the customer at a remote location via the network, wherein the recipient data comprises a recipient identifier, the delivery data comprises a delivery date and time designated by the customer, and payment data comprises a payment type designated by the customer;
   obtaining, at a payment module using at least the programmed computer processor, a stored value card via the network based at least in part on the payment data including the type designated by the customer;
   debiting, at the payment module using at least the programmed computer processor, an amount of the stored value card from an account identified by the customer; and
   delivering, by a delivery module using at least the programmed computer processor, the stored value card to a facility via the network, wherein the facility is a delivery facility and wherein the delivery facility delivers the stored value card based on the delivery data to a recipient identified by the recipient data entered by the customer;
   wherein the recipient data and payment data are entered by the customer on a first day and the stored value card is delivered to the recipient at least one day after the first day; and
   wherein the recipient provides authentication data before the stored value card is activated, wherein the authentication data is provided to a service provider associated with the stored value card, wherein the stored value card is activated for a designated value after authentication data from the recipient is verified.

2. The method of claim 1, wherein the payment type comprises one or more of cashier's check, certified check and money order.

3. The method of claim 1, further comprising the step of:
   associating one or more documents from the customer with the stored value card for delivery to the recipient.

4. The method of claim 1, further comprising the step of:
   providing a tracking identifier to the customer for tracking the delivering of the stored value card to the recipient.

5. The method of claim 1, further comprising the step of:
   providing status data of the stored value card to one or more of the facility and the recipient.

6. The method of claim 1, wherein the steps of claim 1 are performed at a financial institution location.

7. The method of claim 6, wherein the stored value card is generated at the financial institution location.

8. The method of claim 1, further comprising the step of:
   authenticating the customer to confirm identity of the customer.

9. A computer implemented system for expediting payments, wherein the system comprises a programmed computer processor that communicates with a customer via a network, the computer implemented system comprising:
   information module using at least the programmed computer processor for receiving recipient data, delivery data, and payment data from the customer at a remote location via the network, wherein the recipient data comprises recipient identifier, the delivery data comprises a delivery date and time designated by the customer, and payment data comprises a payment type designated by the customer;
   payment module using at least the programmed computer processor for obtaining a stored value card via the network based at least in part on the payment data including the payment type designated by the customer and debiting an amount of the stored value card from an account identified by the customer; and
   delivery module using at least the programmed computer processor for delivering the stored value card to a facility via the network, wherein the facility is a delivery facility and wherein the delivery facility delivers the stored value card based on the delivery data to a recipient identified by the recipient data entered by the customer;
   wherein the recipient data and payment data are entered by the customer on a first day and the stored value card is delivered to the recipient at least one day after the first day; and
   wherein the recipient provides authentication data before the stored value card is activated, wherein the authentication data is provided to a service provider associated with the stored value card, wherein the stored value card is activated for a designated value after authentication data from the recipient is verified.

10. The system of claim 9, wherein the payment type comprises one or more of cashier's check, certified check and money order.

11. The system of claim 9, further comprising the step of:
    associating one or more documents from the customer with the stored value card for delivery to the recipient.

12. The system of claim 9, further comprising the step of:
    providing a tracking identifier to the customer for tracking the delivering of the stored value card to the recipient.

13. The system of claim 9, further comprising the step of:
    providing status data of the stored value card to one or more of the facility and the recipient.

14. The system of claim 9, wherein the steps of claim 1 are performed at a financial institution location.

15. The system of claim 14, wherein the stored value card is generated at the financial institution location.

16. The system of claim 9, further comprising the step of:
    authenticating the customer to confirm identity of the customer.

17. A non-transitory computer readable medium comprising instructions, performing the method as recited in claim 1.

* * * * *

UNITED STATES PATENT AND TRADEMARK OFFICE
CERTIFICATE OF CORRECTION

| | | |
|---|---|---|
| PATENT NO. | : 8,290,862 B2 | Page 1 of 1 |
| APPLICATION NO. | : 10/897177 | |
| DATED | : October 16, 2012 | |
| INVENTOR(S) | : Sheehan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 670 days.

Signed and Sealed this
Twenty-third Day of September, 2014

Michelle K. Lee
*Deputy Director of the United States Patent and Trademark Office*